US007098808B2

(12) United States Patent
Stone et al.

(10) Patent No.: US 7,098,808 B2
(45) Date of Patent: Aug. 29, 2006

(54) SYSTEM HAVING TERMINATION FOR DATA LOADING PORT

(75) Inventors: Cyro Allen Stone, Peoria, AZ (US); Douglas W. Guetter, Gilbert, AZ (US); Desi D. Stelling, Glendale, AZ (US)

(73) Assignee: Aviation Communication & Surveillance Systems, LLC, Phoenix, AZ (US)

(*) Notice: Subject to any disclaimer, the term of this patent is extended or adjusted under 35 U.S.C. 154(b) by 550 days.

(21) Appl. No.: 10/260,241

(22) Filed: Sep. 30, 2002

(65) Prior Publication Data

US 2004/0063339 A1 Apr. 1, 2004

(51) Int. Cl.
*G08B 21/00* (2006.01)

(52) U.S. Cl. ................ 340/945; 340/426.12; 439/43

(58) Field of Classification Search ............. 340/945, 340/990, 426.12; 439/43, 189, 884, 865
See application file for complete search history.

(56) References Cited

U.S. PATENT DOCUMENTS

| | | | | |
|---|---|---|---|---|
| 3,768,090 A | | 10/1973 | Williams ................. 340/311 |
| 4,378,551 A | | 3/1983 | Drapac .................. 340/311.1 |
| 4,497,528 A | | 2/1985 | Murtland ............... 339/45 M |
| 4,525,865 A | | 6/1985 | Mears ..................... 455/186 |
| 4,688,261 A | | 8/1987 | Killoway et al. ........... 455/76 |
| 4,924,520 A | * | 5/1990 | Kolbert .................... 380/59 |
| 5,023,936 A | | 6/1991 | Szczutkowski et al. ...... 455/90 |
| 5,694,335 A | * | 12/1997 | Hollenberg ................ 713/201 |
| 6,127,944 A | * | 10/2000 | Daly et al. ................ 340/963 |
| 6,300,874 B1 | * | 10/2001 | Rand ..................... 340/568.2 |
| 6,309,246 B1 | * | 10/2001 | Keaton et al. ............. 439/509 |
| 6,426,692 B1 | * | 7/2002 | Bruhnke et al. .......... 340/10.4 |
| 6,634,896 B1 | * | 10/2003 | Potega ................... 439/218 |
| 6,825,795 B1 | * | 11/2004 | Segredo ................... 342/51 |

OTHER PUBLICATIONS

Author: Airlines Electronic Engineering Committee; Title: Airborne Computer High Speed Data Loader Arinc Report 615-4; May 6, 2002; pp. 45-46.

* cited by examiner

*Primary Examiner*—Phung T. Nguyen
(74) *Attorney, Agent, or Firm*—Allen J. Moss; Squire, Sanders & Dempsey L.L.P.

(57) ABSTRACT

A subsystem of an avionics system is operated in a first mode for receiving software via a port; and in a second mode in accordance with a circuit that includes a terminator coupled to the port. By using the terminator to convey information regarding a desired configuration for operation in the second mode, communication and wiring is avoided between subsystems of the avionics system for conveying such information. In one implementation, operation in the second mode includes performing a collision avoidance function (e.g., providing a TCAS advisory). Configuration information in accordance with the circuit may specify an arrangement of shared antennas between multiple transponders and/or mode changes related to using an antenna for a collision avoidance function in a hijack mode of operation.

10 Claims, 5 Drawing Sheets

SYSTEM HAVING TERMINATION FOR DATA LOADING PORT

FIELD OF THE INVENTION

Embodiments of the present invention relate to installing software and establishing a configuration for the operation of electronic equipment.

BACKGROUND OF THE INVENTION

Electronic equipment, especially cockpit avionics, are conventionally designed to operate according to parametric values established for a particular installation. By relying on parametric values that are associated with variations in installations (e.g., on different aircraft), the cost of design and qualification of avionics can be spread across many different installations and maintenance costs for a population of avionics may be reduced. In a typical installation and configuration, tables of alternative parametric values are stored in memory of a processor of the avionics; and, some external indication is ascertained for the selection of values particularly suitable for the current installation.

One technique is to choose a connector that is part of the permanent installation of the avionics (e.g., a connection already required for power, input, or output signals), reserve contacts in the connector for short circuits, define a code for the shorts, opens, and/or resistance between reserved contacts of that connector, and associate the code with a table of parametric values. In operation, the processor reads interface circuits that provide the code, uses the code as an index into the table, reads the parametric values from the table, and establishes, in accordance with the parameters, any operational criteria, such as, power conditioning, circuit functions, initial conditions, modes of operation, use of resources, identifications, limit conditions, and branch conditions. Giving effect to various parametric values may require switching circuitry for routing signals in alternate ways.

Avionics may be designed to permit the in situ installation of new software for use by the avionics. In a conventional arrangement, the avionics may have an interface connector (e.g., on a front or rear panel) for data communication signals used to accept the new software when on the ground or otherwise not in service. In situ installation of software avoids the expense of removing the avionics from some or all of its permanent installation (e.g., releasing mechanical restraints, extending circuit assemblies out of the position used in flight, disconnecting cables). Unfortunately, in situ installation of software is expensive in that it requires access to skilled personnel and equipment capable of providing the digital communication signals for transferring the software from such equipment to the avionics.

Without new methods for configuring avionics, the installation and maintenance of avionics will continue to be limited

SUMMARY OF THE INVENTION

A method for operating a subsystem of an avionics system includes in any order, receiving, in a first mode of operation, software via a port; and operating, in a second mode of operation, in accordance with a circuit that includes a terminator coupled to the port.

By using the terminator to convey information regarding a desired configuration (e.g., operation in the second mode), communication and wiring is avoided between subsystems of the avionics system for conveying such information.

In one implementation, operation in the second mode includes performing a collision avoidance function (e.g., providing a TCAS advisory). Such a method may further include using an antenna for a collision avoidance function in a hijack mode of operation in accordance with the circuit.

In yet another implementation, operation in the second mode includes a hijack mode of operation.

The port, in another implementation, is part of the front panel of the subsystem, for example, a front panel receptacle used for in situ installation of software and for termination as discussed above. The front panel receptacle is connected to a terminator that completes a circuit of the subsystem. The circuit establishes a configuration of the installed software (e.g., implements a switching function, or provides a value for a parameter or variable). The circuit of the subsystem may incorporate the contacts of the receptacle to perform any modification of circuit functions (e.g., analog signal conditioning, switching functions, and/or digital logic controls) in accordance with a path between contacts (e.g., short, open, or resistance) or a signal appearing on or between contacts (e.g., logic high, logic low, data word received in true or complement form, a meaningful signal amplitude, frequency, or modulation).

By detecting one or more paths and/or signals completed by the terminator, a code may be determined for use in controlling the subsystem's circuit functions or software functions. Because conventional data ports provide signals from which hundreds of alternative codes may be designed, the invention has wide practical application.

When such a terminator replaces a conventional dust cover for the port, and the terminator is designed to include a minimum number of short circuit paths, enhanced operation of the avionics is realized with no change in cockpit wiring and with little additional cost for hardware and hardware support (e.g., depot inventory).

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

In systems according to various aspects of the present invention, a subsystem (e.g., a line replaceable unit (LRU) of an avionics system) has a port used in at least two modes of operation. In a first mode, software is accepted for in situ installation. When the port comprises a connector, a cable is connected to the connector and to a source of signals used to convey the software into the port. In a second mode, a terminator at the port provides configuration information for use by the installed software. When the port comprises a connector, a first circuit in the subsystem is coupled to a second circuit in the terminator (e.g., a code plug, or a circuit installed in a dust cover) as the terminator is connected to the connector. In one implementation, the circuit of the terminator shorts particular contacts of the connector to convey configuration information.

Figure 1:
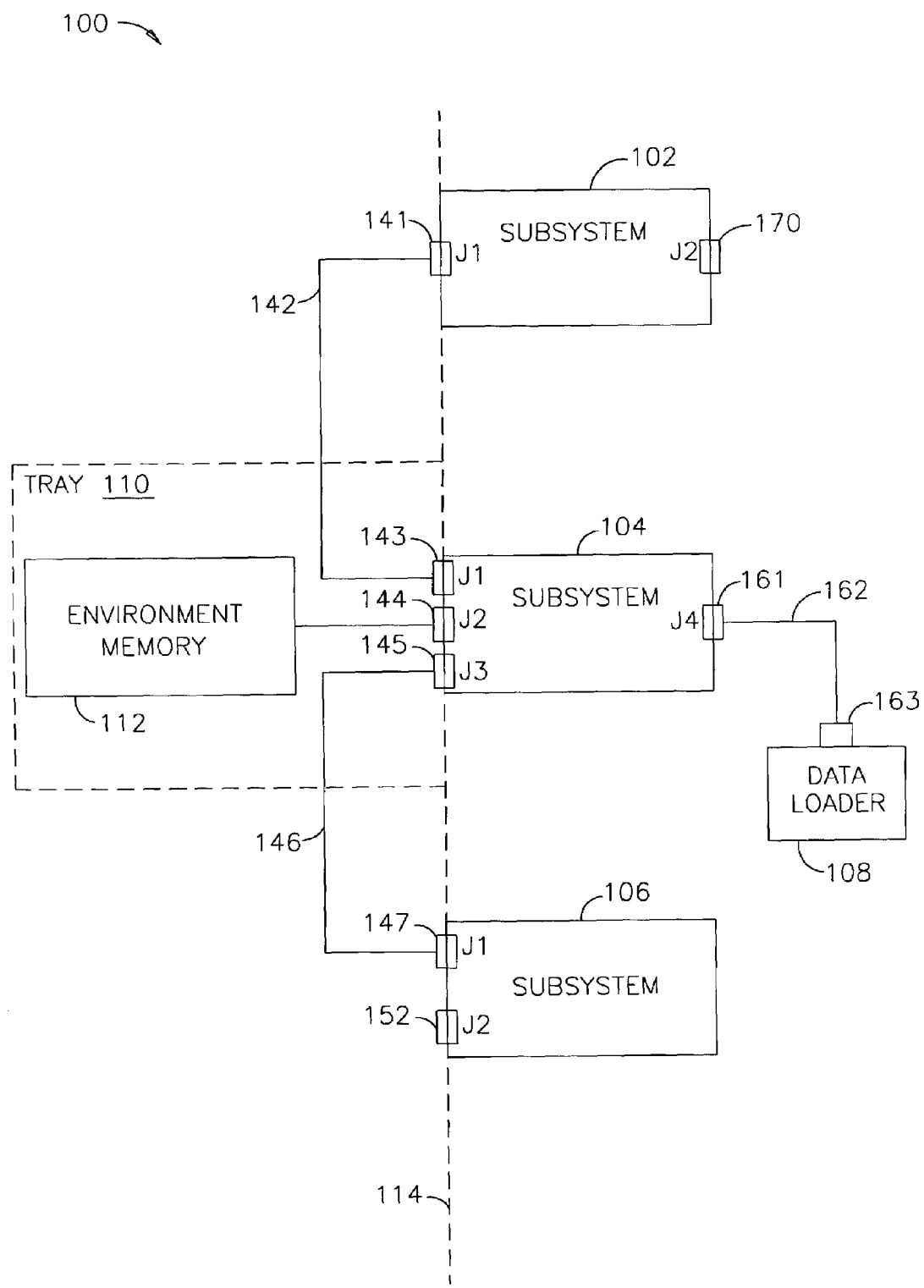
FIG. 1 is a functional block diagram of a system according to various aspects of the present invention.

For example, system 100 of FIG. 1 generally illustrates a system architecture according to various aspects of the present invention. System 100 is typically installed in a vehicle (e.g., an aircraft, land vehicle, space vehicle, ship, or submarine). System 100 may perform any vehicular control function, operator decision support function, payload operation function, or passenger entertainment function. System 100 includes subsystems 102, 104, and 106 each of which is mechanically and electrically installed at an interface 114. Interface 114 may include rack mount structures for holding subsystems in relative position during use of the vehicle. Interface 114 is designed to permit removal and replacement of one or more subsystems for maintenance or repair of the subsystem. Interconnecting cables for power, analog signals, and digital signals are somewhat permanently installed on the interconnection side of interface 114 while subsystems are installed and operated from the operation side of interface 114. Interface 114 may include bays or trays facilitating subsystem installation and removal. For example, system 100 includes tray 110. A tray provides mechanical support for a subsystem or for connections at interface 114. A tray may also include memory read by the subsystem for directing operation of a subsystem.

The interconnection side of interface 114 includes cables 142, and 146. Cable 142 has a connector 141 to subsystem 102 receptacle J1 and a connector 143 to subsystem 104 receptacle J1. Cable 146 has a connector 145 to subsystem 104 receptacle J3 and a connector 147 to subsystem 106 receptacle J1. Environment memory 112 of tray 110 is accessed via connector 144 to subsystem 104 receptacle J2. Conventional code plug 152 is connected somewhat permanently to subsystem 106 receptacle J2. In operation, conventional circuits of subsystem 106 read the interconnections among receptacle contacts of J2 to govern at least a portion of the operation of subsystem 106.

Subsystems 102 and 104 each include a port used in two modes of operation, as discussed above. On subsystem 102, front panel receptacle J2 provides such a port. On subsystem 104, front panel receptacle J4 provides such a port. As shown, subsystem 102 is prepared to perform vehicular operations as discussed above (e.g., in a normal mode of operation of system 100). Also as shown, software is being installed into subsystem 104 via receptacle J4. After installation of software, data loader 108 and cable 162 are removed and subsystem 104 receptacle J4 is covered with a terminator of the type discussed below with reference to 170.

A conventional data loader provides signaling protocol and data from media mounted in or on the data loader to an interface for connection to a subsystem. For example, data loader 108 includes a conventional data loader of the type described in ARINC specifications and reports of the 603, 614, and 615 families available from Aeronautical Radio, Inc. Data loader 108 is connected by cable 162 to subsystem 104 receptacle J4 for copying software from media mounted on data loader 108 (e.g., CD-ROM) to a memory (e.g., magnetic or optical disk, semiconductor RAM, FLASH, or EPROM) in subsystem 104. Cable 162 includes connector 161 connected to subsystem 104 receptacle J4 and connector 163 connected to data loader 108. In one implementation, data loader 108 may be connected to subsystem 102 at J2 using the same or a different cable 162. Data from data loader 108 may be stored through a subsystem into environment memory. For example, either subsystem 104 or data loader 108 may store data in environment memory 112.

Figure 2A:
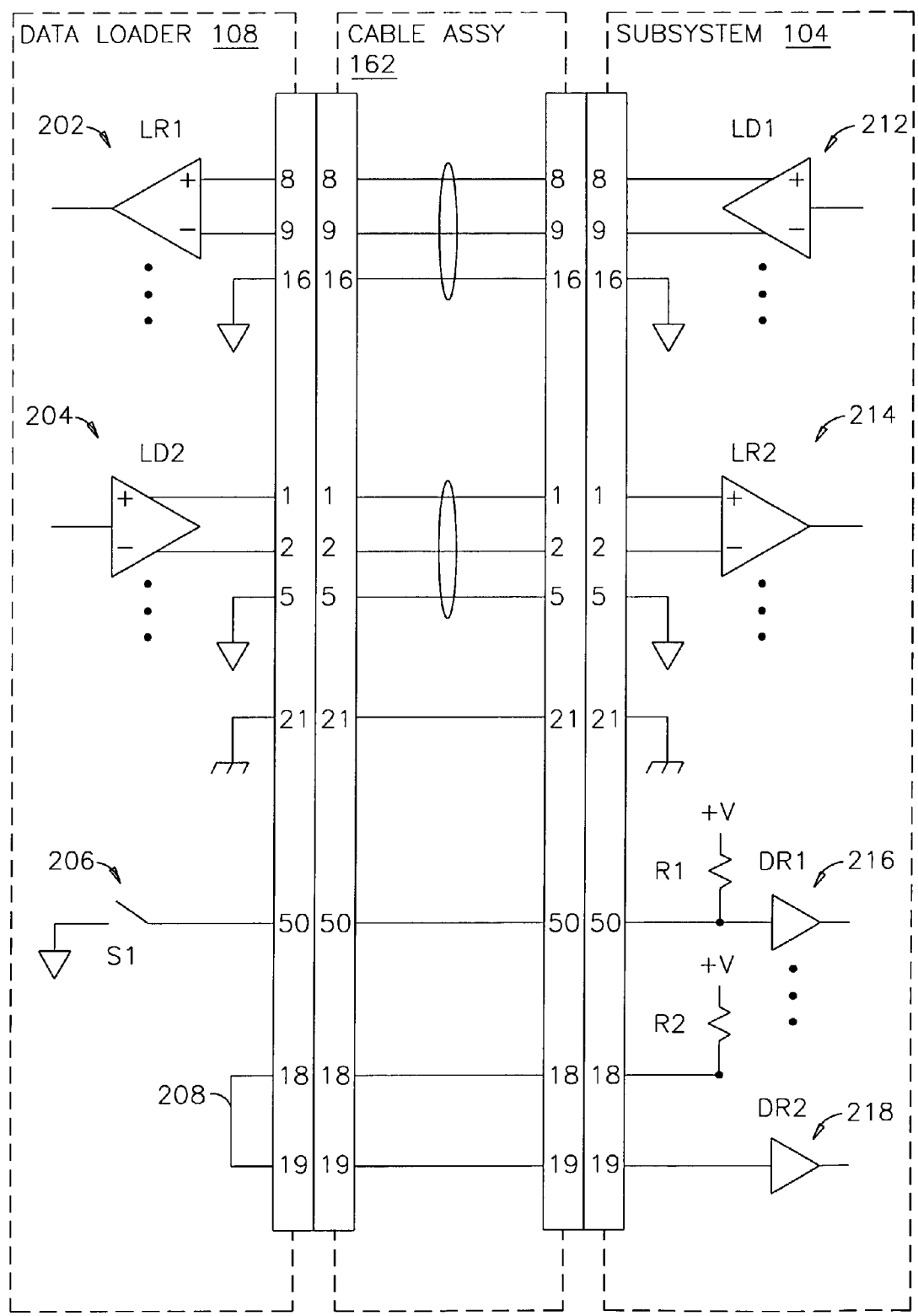
FIG. 2A is a partial schematic diagram of a data loader connected to a subsystem according to conventional techniques.

Data loading is facilitated by interface circuits of the data loader, connecting cable, and subsystem. For example, interface circuits of data loader 108, cable assembly 162, and subsystem 104 of FIG. 2A include conventional differential line receivers, conventional differential line drivers, and conventional discrete line receivers. Data loader 108 includes any number of line receivers 202 (e.g., LR1), typically one for each ARINC 429 bus line used to receive data (e.g., status and control signals) into data loader 108. Data loader 108 includes any number of line drivers 204 (e.g., LD2), typically one for each ARINC 429 bus line used to transmit data (e.g., software for a subsystem memory) into subsystem 104. Data loader 108 may further include one or more switches 206 (e.g., front panel switch S1 for use by an operator of data loader 108) for manually setting conventional discrete inputs of subsystem 104; and may include one or more links 208 used conventionally for automatically determining that a cable (e.g., 162) has been connected to subsystem 104 in preparation for data loading. Chassis and ground signals (e.g., for safety, limiting electrical interference, and providing reference potentials) are coupled between data loader 108 and subsystem 104 via shields (e.g., contacts 5 and 16), and via dedicated conductors (e.g., contact 21).

A subsystem includes interface circuits for cooperating with the data loading functions. For example, subsystem 104 includes any number of line drivers 212 (e.g., LD1), typically one for each ARINC 429 bus line used to transmit data (e.g., status and control signals) from subsystem 104. Subsystem 104 includes any number of line receivers 214 (e.g., LR2), typically one for each ARINC 429 bus line used to receive data (e.g., software for a subsystem memory) into subsystem 104. Subsystem 104 may further include one or more line receivers 216 and 218 for sensing conventional discrete inputs of subsystem 104 (e.g., manually set switch positions, or relay contact closures) and sensing one or more links 208.

According to various aspects of the present invention, a terminator for a data loader port of a subsystem indicates information for subsystem operation. In one implementation, the terminator completes a circuit of the subsystem. For example, subsystems 102 and 104 include circuits each comprising a receptacle J2 and J4 respectively used in turn with a data loader 108. Terminator 170 provides a termination for data loader port J2 of subsystem 102 and completes a circuit of subsystem 102. When a terminator completes a circuit of a subsystem, the circuit may control any aspect of subsystem operation according to the terminator. For example, a terminator may provide a code readable by software of the subsystem. Such a code may be used directly or as an identifier of other information (e.g., an indirect reference, parameter name, or index) to be used in operation of the subsystem (e.g., an address, or pointer). A terminator may function in a circuit to select a mode of operation, identify a table of parametric values, determine a parametric value, operate a logic circuit, operate a relay circuit, or operate a switching circuit. The circuitry of a terminator used with subsystem 102 may be different from the circuitry of the terminator used with subsystem 104.

Figure 2B:
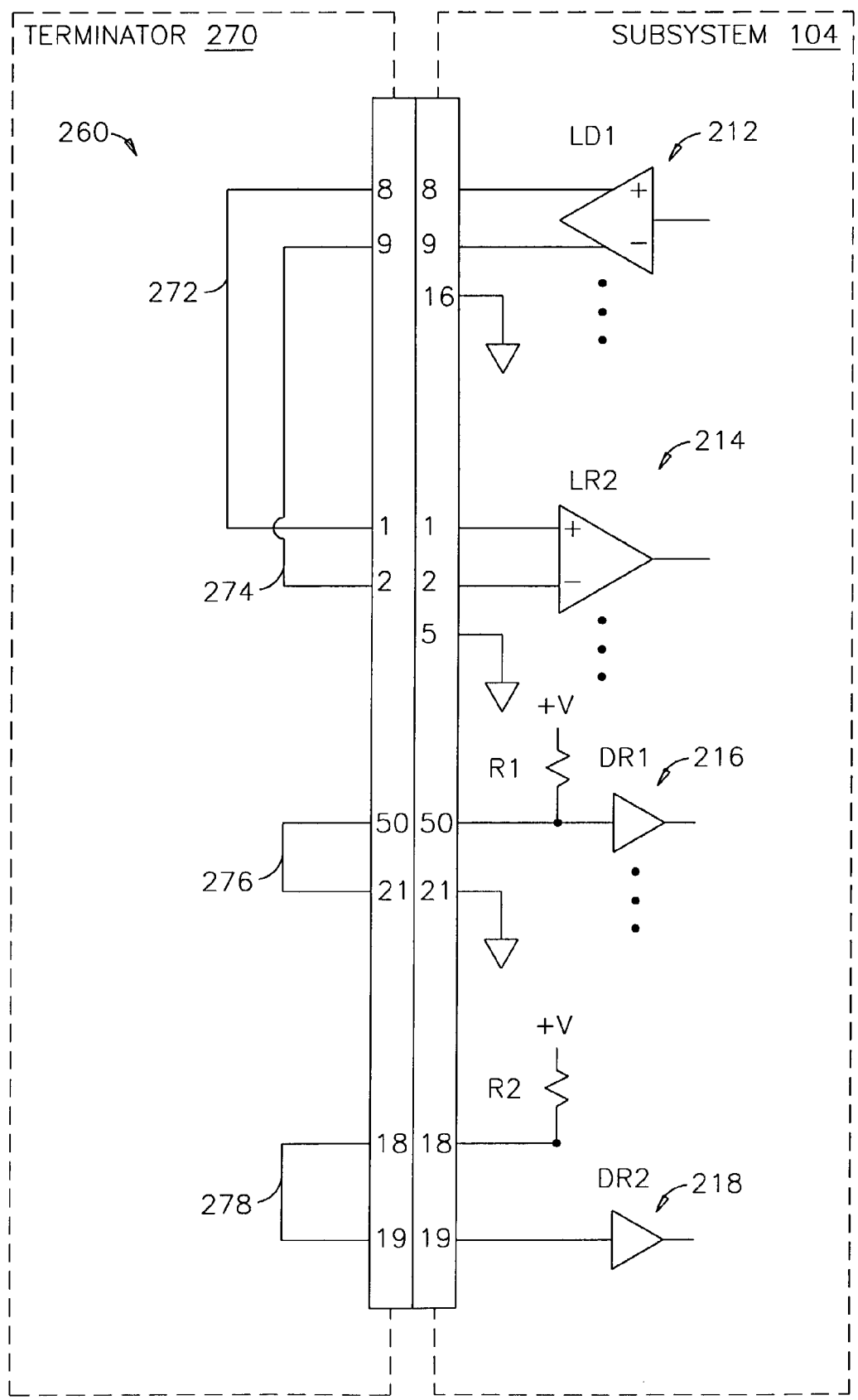
FIG. 2B is a partial schematic diagram of a terminator connected to a subsystem according to various aspects of the present invention.

For example, terminator 270 of FIG. 2B includes a connector P1 and a circuit 260 that cooperates with circuits of subsystem 104 discussed above with reference to FIG. 2A. Circuit 260 includes conductors 272 and 274 that complete a path between LD1 and LR2; conductor 276 that completes a path that grounds a discrete input into DR1 and conductor 278 that completes a path that grounds a link detection circuit DR2. In alternate implementations any number of any of these three types of paths may be used. A large number of configuration codes may be provided by alternative circuits 260. For example, when four discrete inputs are included in subsystem 104 (e.g., J4 contacts 50, 51, 52 and 53), and each discrete input can have one of two states (e.g., open or grounded), any one of $2^4$ or sixteen codes may be implemented using discrete inputs and paths to ground. As another example, when four output buses (e.g., J4 contacts 8 through 15) and two input buses (e.g., J4 contacts 1 through 4) are included in subsystem 104, and each input can have one of five states, any one of $5^4$ or 625 codes may be implemented using paths between buses. The five states of an input bus may include open, coupled to the first output bus, coupled to the second output bus, inversely coupled to the first output bus, and inversely coupled to the second output bus. In an inverse coupling, a conductor (e.g., 272), connects a positive output (e.g., of LD1) to a negative input (e.g., of LR2). When bus paths and discrete input paths are combined, any one of up to 10,000 codes may be implemented in a terminator 270.

Terminator 270 as discussed above is preferred for simplicity, reliability, and low manufacturing costs. Terminator 270 cooperates with circuitry already part of subsystem 104 that is otherwise used for data loading functions. In other words, terminators according to various aspects of the present invention may be implemented with no additional circuitry in a subsystem specific to a terminator. Conventional software techniques may be performed by a processor of subsystem 104 to determine what if any paths are formed by terminator 270 and then put into effect a desired configuration corresponding to the terminator circuitry (e.g., corresponding to a code implemented by terminator circuitry 260).

In alternate implementations, the circuitry of a subsystem may incorporate the contacts of a data port receptacle to perform any modification of circuit functions (e.g., analog signal conditioning, switching functions, and/or digital logic controls) in accordance with a path between contacts (e.g., short, open, or resistance) or a signal appearing on or between contacts (e.g., logic high, logic low, data word received in true or complement form, a meaningful signal amplitude, frequency, or modulation). Such alternate circuitry may include a register for reading path completion logic signals in parallel, an analog to digital converter for reading the value of a resistance between contacts, control circuits (e.g., relay drivers, multiplexors, gates, or electronic switches) that respond to signals coupled via paths formed by terminator circuitry, or signal sources (e.g., unique or out of band signaling such as over voltage, unused frequencies, or special modulations) used through paths of the terminator to operate subsystem circuitry in ways detectable for configuration control or that implement configuration alternatives of the subsystem.

Terminator 270 includes circuit paths for any conventional signal. For example, paths 272–278 each conduct digital signals and in an alternate implementation may conduct a broadband analog, pulsed digital, or modulated signal.

Terminator 270 may be assembled using any conventional connector (e.g., a plug with a back shell or cap) and potting compound to provide environmental protection for circuitry 260. In a preferred implementation, terminator 270 is tethered to the front panel of subsystem 104 for use exclusively with connector J4 of subsystem 104.

In an implementation where interfaces employ optical signaling, the data port and terminator include any conventional techniques for establishing passive paths. For example, a wide or narrow bandwidth path with or without polarization and/or filtering may be implemented using optic fiber, refractors, reflectors, dividers, combiners, and conventional filtering materials and coatings.

Figure 3:
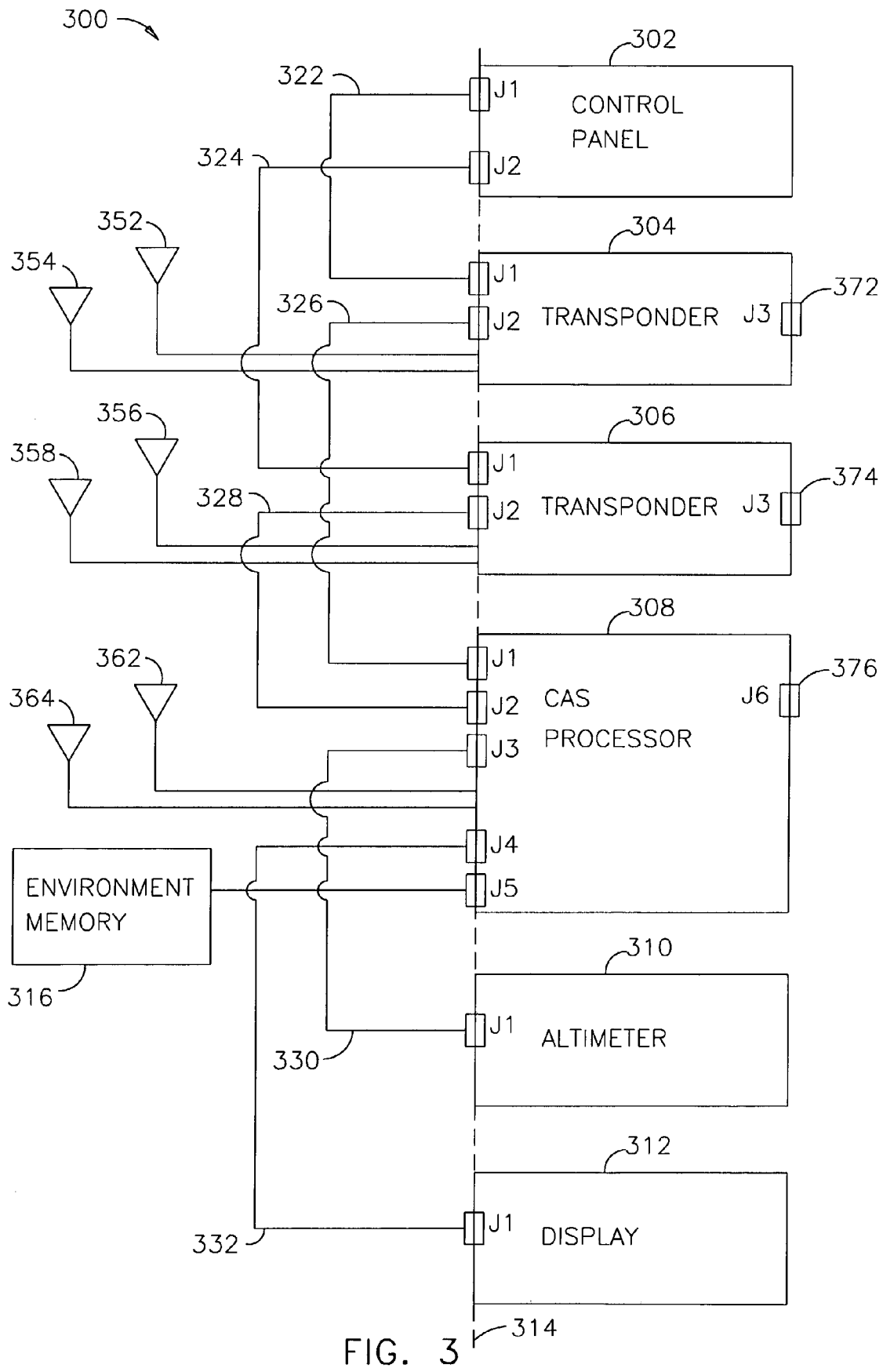
FIG. 3 is a functional block diagram of a traffic collision avoidance system according to various aspects of the present invention.

An avionics system, according to various aspects of the present invention, performs a collision avoidance process in accordance with software loaded via a port and in accordance with a circuit of a terminator coupled to the port. For example, avionics system 300 of FIG. 3 includes a rack mounting interface 314 (e.g., of the type described in ARINC 600) for mounting a plurality of subsystems securely in an aircraft and removably for individual subsystem repair and/or upgrade. Subsystems include a control panel 302, two transponders 304 and 306, a collision avoidance system processor 308 (e.g., of the type described as a TCAS in DO-185A "Minimum Operational Performance Standards for Traffic Alert and Collision Avoidance System II (TCAS II)" available from RTCA Inc.), an altimeter 310, and a display 312.

The installation side of interface 314 includes cables, antennas, and environment memory. For transponder status and control, cables 322 and 324 connect control panel 302 to transponders 304 and 306. For transponder cooperation with CAS processing, cables 326 and 328 connect transponders 304 and 306 to CAS processor 308. Each transponder is connected to two antennas for transmitting and receiving respectively: antennas 252 and 254 for transponder 304 and antennas 356 and 358 for transponder 306. CAS processor 308 includes a transponder coupled to antennas 362 and 364 for transmitting and receiving respectively. Environment memory 316 is connected to CAS processor 306 and contains conventional configuration information, for example, describing the aircraft on which system 300 is installed. Altimeter 310 is connected to CAS processor 308 by cable 330. And, display 312 is connected to CAS processor 308 by cable 332.

System 300 provides traffic advisories and resolution advisories in any conventional manner, for example, as described in DO-185A. Further, transponders of system 300 provide redundancy and cooperate in a normal mode and in a hijack mode. In a hijack mode, each transponder (304 or 306) performs a method, according to various aspects of the present invention, for maintaining transponder and/or TCAS functions.

Figure 4:
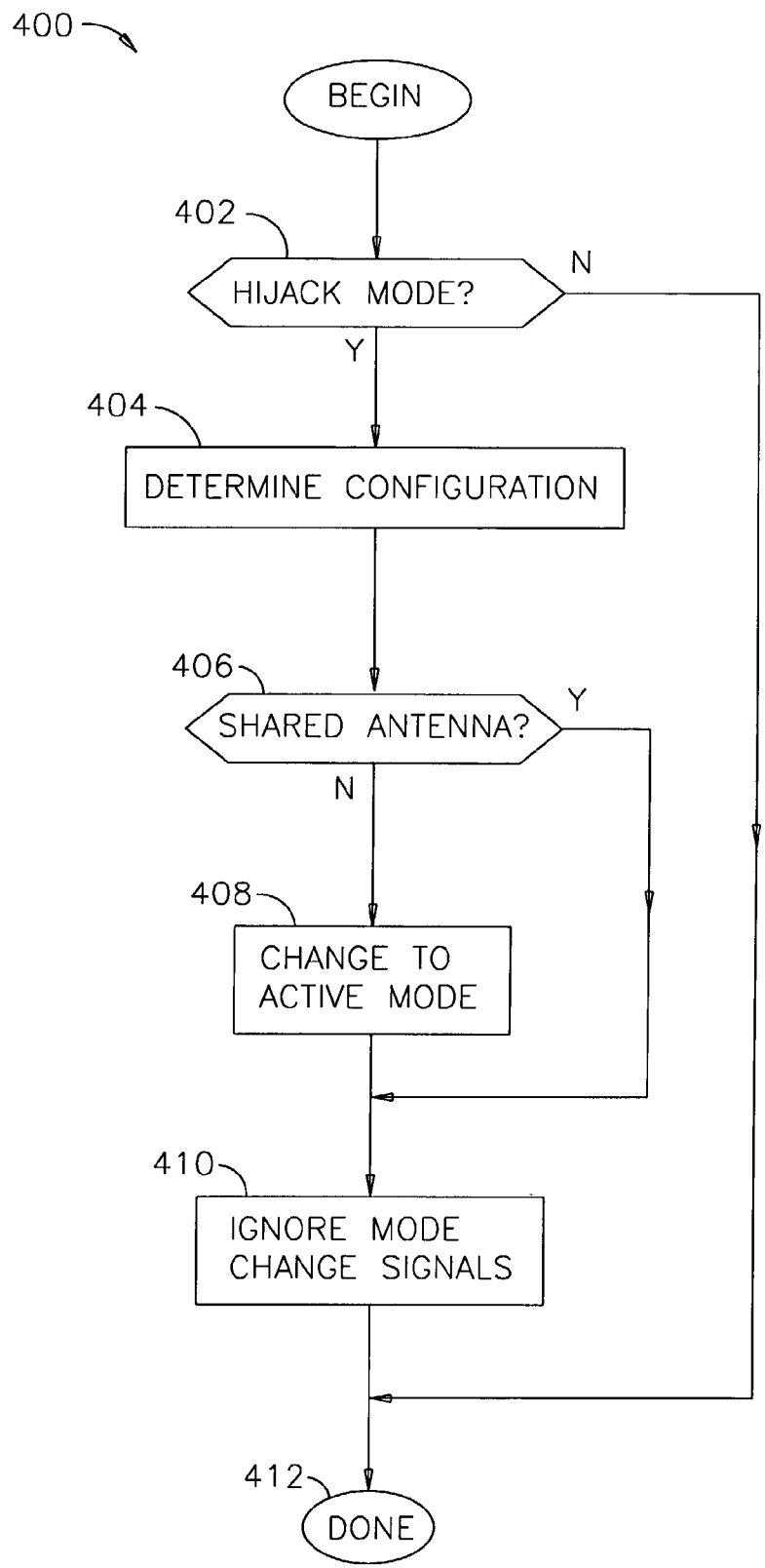
FIG. 4 is a process flow diagram of a method for configuring a function of a transponder in the system of FIG. 3.

For example, a method of transponding performed by transponder 304 (e.g., and by 306) includes a method 400 of FIG. 4 for maintaining transponder operations. To begin, it is determined (402) whether transponder 304 is currently operating (or commanded to operate) in a hijack mode of operation; and, if not, then no further action is taken in method 400. Otherwise, the present operating configuration of transponder 304 is determined (404). Determining the present operating configuration includes detecting the presence of a terminator of the type described above with reference to terminator 270. If present, determination of configuration further includes detecting directly or indirectly any attributes of circuitry of the terminator (260) including any modification of circuit functions, paths, and/or signal. Collectively, the combination of modification of circuit functions, paths, and/or information conveyed by signals is referred to herein as a configuration. The determination (404) provides indicia of configuration that may be analyzed and used for decisions of method 400. For example, whether or not transponder 304 is currently operating with an antenna that is shared with another function (e.g., another transponder) is determined (406) by testing directly or indirectly the indicia of configuration. An indirect test may include a test on a result of using some or all of the indicia (e.g., a code or value) in an algorithmic expression (e.g., bit mask) or in a table look up as discussed above. If a shared antenna is being used, the transponder continues operating in an active mode (e.g., assures that it is in an active mode and changes to an active mode if necessary). Transponder 304 (and 306) may operate normally in an active mode as opposed to a standby mode as specified, for example, by a pilot-operated switch on control panel 302 in accordance with industry standards and reports in families 718 and 735. Industry standards include standards, specifications, and recommendations for any transportation industry: military or civilian (e.g., aviation, land vehicles, ships and submarines, space craft). For example, suitable industry standards include publications by ARINC, RTCA Inc., Air Transport Association, Federal Aviation Administration, Society of Automotive Engineers, Federal Communications Commission, Institute of Electrical and Electronic Engineering, American National Standards Institute, National Institute of Standards and Technology, Computer and Communications Industry Association, International Telecommunication Union, International Technical Commission, International Standards Organization, and Electrical Industry Association. Mode change (408) is avoided when no shared antenna is being used (406). Finally, further mode change signals (if any) are ignored for purposes of effecting a mode change. For example, if a pilot-operated switch on control panel 302 is set in an attempt to place transponder 304 in a standby (e.g., non-transmitting) mode, transponder 304 remains in an active mode (e.g., transmitting squitters and/or responses to interrogations).

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A system comprising:
   a plurality of subsystems coupled at a first interface for communication of signals among subsystems, wherein at least one particular subsystem comprises:
     a second interface comprising a port for receiving software; and
     a first circuit coupled to the port; and
   a terminator, coupled to the port when the port is not receiving software, the terminator comprising a second circuit coupled to the first circuit, wherein a function of the subsystem is performed in accordance with the first circuit and the second circuit;
   wherein the system is installed on a host aircraft to perform a collision avoidance function and the system is operative in a normal mode and in a hijack mode and operation in the hijack mode is in accordance with the first circuit and the second circuit.

2. The system of claim 1 wherein the second interface further comprises at least one of a control operated by an operator of the system and a display viewed by an operator of the system.

3. The system of claim 1 wherein the first circuit comprises logic and the second circuit comprises provides a logic signal to the logic.

4. The system of claim 1 wherein the logic comprises digital logic components.

5. The system of claim 1 wherein the logic comprises a relay.

6. The system of claim 1 wherein the particular subsystem comprises a transponder.

7. The system of claim 1 wherein the particular subsystem comprises a TCAS processor.

8. The system of claim 1 wherein the port is operable according to an industry standard.

9. The system of claim 1 further comprising a transponder for collision avoidance signaling in accordance with operation of the first circuit and the second circuit.

10. The system of claim 9 wherein the system further comprises a plurality of antennas coupled to the transponder for collision avoidance signaling, and a particular antenna provides the collision avoidance signaling in accordance with operation of the first circuit and the second circuit.

* * * * *